United States Patent [19]

Lukaschek et al.

[11] 4,366,285

[45] Dec. 28, 1982

[54] PROCESS FOR THE PRODUCTION OF AN ELASTOMER-FILLER MIXTURE OPTIONALLY CONTAINING EXTENDER OILS

[75] Inventors: Wolfgang Lukaschek, Marl; Wolfgang Marx, Duelmen, both of Fed. Rep. of Germany

[73] Assignee: Chemische Werke Huls, A.G., Marl, Fed. Rep. of Germany

[21] Appl. No.: 282,772

[22] Filed: Jul. 13, 1981

[51] Int. Cl.³ ............................ C08L 9/00; C08K 3/36
[52] U.S. Cl. .................................. 524/521; 523/204; 523/205; 523/216; 524/475; 524/555
[58] Field of Search ............... 260/92.15, 42.54, 42.52, 260/42.55, 29.6 WQ, 29.7 W, 33.6 AQ; 524/475, 521, 555; 523/204, 205, 216

[56] References Cited

U.S. PATENT DOCUMENTS

| 3,462,400 | 8/1969 | Ashby et al. | 524/855 |
| 3,700,619 | 10/1972 | Bukke | 260/52.54 |
| 3,734,873 | 5/1973 | Anderson et al. | 260/29.6 SQ |
| 3,843,585 | 10/1974 | Kangas et al. | 260/29.7 W |
| 3,849,363 | 11/1974 | Maass et al. | 260/42.55 |
| 3,878,153 | 4/1975 | Driscoll | 260/42.55 |
| 3,979,349 | 9/1976 | Fink et al. | 260/29.6 WQ |
| 4,029,622 | 6/1977 | Keller et al. | 260/29.6 WQ |
| 4,128,520 | 12/1978 | Barabas | 260/29.7 W |
| 4,297,256 | 10/1981 | McDonald | 260/29.6 WQ |

FOREIGN PATENT DOCUMENTS 2806646 8/1978 Fed. Rep. of Germany ...... 525/218

OTHER PUBLICATIONS

Reweait Abs. 60675C/35 DT 2806646 (8-2114 1980) Bunawerke.
Chem. Abst. 78-111792q, Fanta et al. (1973).

Primary Examiner—John C. Bleutge
Assistant Examiner—H. Lilling
Attorney, Agent, or Firm—Millen & White

[57] ABSTRACT

A process for producing an elastomer-filler mixture optionally containing an extender oil, comprising the combined precipitation of a homogeneous mixture of a synthetic elastomer latex, produced by emulsion polymerization in an anionic emulsifier system, and an aqueous suspension of a silicic acid based filler, using an acid and, optionally, an electrolyte or other flocculant; separation of the precipitated mixture; and drying of the mixture; is improved in that the filler suspension contains 0.1-5% by weight, based on the amount of filler, of a copolymer of acrylamide and dimethylaminoethyl methacrylate.

11 Claims, No Drawings

PROCESS FOR THE PRODUCTION OF AN ELASTOMER-FILLER MIXTURE OPTIONALLY CONTAINING EXTENDER OILS

BACKGROUND OF THE INVENTION

The present invention relates to a process for precipitating elastomer-filler mixtures optionally containing extender oils.

As is known, the usefulness and processability of raw elastomer mixtures can be substantially influenced by the addition of fillers. Thereby, the properties of the final vulcanizates can be adapted to the requirements of the end use. Depending on the effect of the filler additives on the raw mixture and on the mechanical properties of the vulcanized products, the fillers are frequently classified as highly active, active, semiactive, and inactive. Highly active and active fillers are also called reinforcing fillers.

Besides the conventional carbon blacks, light-colored fillers are of industrial importance, primarily those based on silicic acid. While carbon black inherently exhibits a certain affinity to organic types of elastomers, this is not so with the light-colored fillers, especially light-colored fillers based on silicic acid. Considerable problems are thus encountered in admixing such light-colored fillers and, above all, in uniformly distributing them in the elastomer. This is true particularly for the processes wherein the light-colored reinforcing filler is incorporated into the elastomer using a conventional mixing unit in the rubber-processing industry (e.g., a rolling mill, masticator, etc.).

To increase the affinity between such fillers and the elastomer, and thus to shorten the requisite mixing periods, if possible, polar organic compounds are frequently employed with the fillers. These polar organic compounds, due to their hydrophilic portions, can be adsorbed on the fillers and thus render the filler particles more lyophilic. Materials of this type include, for example, stearic acid and benzoic acid. In spite of these auxiliary agents, the mixing procedures on the rolling mill or in the masticators still involve the danger that the elastomer component will be irreversibly damaged by the relatively long period of mixing still required.

Accordingly, many attempts have been made to develop processes for the production of elastomer-filler mixtures which are gentler to the elastomer component, primarily for the production of elastomer-filler mixtures which contain light-colored reinforcing fillers and specifically silicic acid.

Thus, a number of processes is known wherein the elastomer-silicic acid mixture is prepared by the combined precipitation of elastomer dispersions and alkali metal silicate solutions. The starting materials are emulsifier-containing mixtures of elastomer dispersions and alkali metal silicate. Precipitation is carried out while maintaining specific conditions by adding acids in the presence or absence of electrolytes. (See German Pat. No. 1,148,067 (U.S. Pat. No. 3,849,363); German Pat. No. 1,184,491 (U.S. Pat. No. 3,392,140); German Pat. No. 1,204,405 (U.S. Pat. No. 3,849,363) and addition to German Pat. No. 1,148,067; German Pat. No. 1,215,918; and German Pat. No. 1,297,858 (U.S. Pat. No. 3,190,851). The disadvantages of these processes include, on the one hand, the fact that the silicic acid obtained during the combined precipitation step cannot be adequately controlled with respect to its structure within the elastomer so that a constancy of properties exhibited by the thusformed elastomer-silicic acid mixtures cannot be satisfactorily maintained; and, on the other hand, there is a relatively large loss of unbound silicic acid, which is obtained in the residual fluid of the elastomer latex and cannot be reused.

It is furthermore known to produce elastomer-silicic acid mixtures by mixing elastomer dispersions with silicic acid dispersions in the presence of quaternary ammonium salts having one hydrogen atom. The elastomer-silicic acid mixtures are precipitated from the mixtures by the addition of acids and/or salts (See German Pat. No. 1,224,481 (British Pat. No. 1,030,616). This process, although enabling the incorporation of a silicic acid of a defined structure into the elastomer, still exhibits the drawbacks that an inordinately large amount of the silicic acid is not absorbed by the elastomer. Thus, either an expensive recovery procedure is required or the unused silicic acid constitutes a pollutant in the wastewater.

SUMMARY OF THE INVENTION

Therefore, it is an object of this invention to provide a process for the production of elastomer-filler mixtures, the filler being based on silicic acid, wherein the filler can be incorporated into the elastomer with a defined structure and to an extensive degree by a simple and economical procedure, and which lacks the foregoing disadvantages.

Upon further study of the specification and appended claims, further objects and advantages of this invention will become apparent to those skilled in the art.

These objects have been attained by providing a process for the production of an elastomer-filler mixture, optionally containing extender oils, by combined precipitation of a homogeneous mixture of a synthetic elastomer latex, produced by emulsion polymerization in an anionic emulsifier system, and an aqueous suspension of a filler based on silicic acid, using acids, and, optionally, electrolytes and/or other flocculants; separation; and drying of the mixture; wherein the filler suspension contains 0.1-5% by weight, based on the amount of filler, of a copolymer of acrylamide and dimethylaminoethyl methacrylate.

DETAILED DISCUSSION

All details of the process of this invention other than for the inventive aspect are fully conventional unless specified otherwise herein, and are disclosed, for example, in Ullmanns Encyklopädie der technischen Chemie, Bd. 9, S. 321 ff., whose disclosure is incorporated by reference herein.

Suitable elastomer latices include within the scope of this invention dispersions of homo- and copolymers of conjugated dienes. These can be prepared by radical polymerization with the use of soap-like emulsifiers according to known methods of the prior art (See, for example, Houben-Weyl, "Methoden der organischen Chemie" (Methods of Organic Chemistry, vol. XIV/1 (1961), "Herstellung von Kautschuken" (Production of Elastomers), pp. 712 et seq; "Ullmanns Enzyklopaedie der technischen Chemie" (Ullmann's Encyclopedia of Technical Chemistry), vol. 9 (1957): 325–339; as well as German Pat. Nos. 679,587; 873,747; and 1,130,597; all of whose disclosures are incorporated by reference herein). Suitable conjugated dienes include 1,3-butadiene, isoprene, piperylene, 2-chloro-1,3-butadiene, 2-methyl-1,3-butadiene, 2,3-dichloro-1,3-butadiene and 2,3-dimethyl-1,3-butadiene. The copolymers can be produced from mixtures of these conjugated dienes, as well as from mixtures of these conjugated dienes with vinyl compounds, e.g., styrene, α-methylstyrene, acrylonitrile, acrylic acid, methacrylic acid, and vinylpyridine. A styrene-butadiene latex having a styrene proportion of 15–50% by weight, preferably 20–40% by weight, is preferably utilized in the process of this invention. The solids content of the latices is generally 15–50% by weight, preferably 20–30% by weight.

The latices suitable for the process of this invention contain an anionic emulsifier system which is stable only in the alkaline pH range (e.g., 8–12) and loses its emulsifying activity in the transition to the acidic pH range.

The emulsifier system consists entirely or partially of alkali metal salts dissolved in water, preferably sodium salts of resin acids, e.g., derivatives of levopimaric acid, pimaric acid and abietic acid. Mixtures of such suitable resin soaps (resinates) or resin acids are commercially available and can be produced from root resins, balsamic resins and/or tall resins by disproportionation.

The resin acid salts can be substituted partially (usually up to 50%) or entirely by salts (e.g., alkali metal salts) of fatty acids of 12–20 carbon atoms (e.g., salts of palmitic acid, stearic acid, oleic acid, or mixtures thereof). Also, emulsifier systems are known wherein purely synthetic compounds predominate, such as alkyl sulfonate, arylalkyl sulfonates, and arylalkyl carboxylic acid salts. Compounds of the last-mentioned chemical types were utilized for the production of latices from emulsion-polymerized products (emulsion polymers), primarily at the beginning of the development of emulsion polymerization.

Suitable for the preparation of the aqueous suspension of a silicic acid based filler is, above all, extensively crystallized, partially hydrated silicon dioxide—also frequently called silicic acid. This compound can be obtained by the pyrogenous as well as wetchemical methods (see, e.g., S. Boström, "Kautschuk-Handbuch" (Rubber Manual), vol. 2 (1960): 250; and Ullmanns Enzyklopaedie der technischen Chemie, vol. 15 (1964): 721–722 whose disclosures are incorporated by reference herein). In addition to silicon dioxide, it is also possible to use natural and synthetic silicates, such as calcium silicate and aluminum silicate (see, S. Boström, "Kautschuk-Handbuch," vol. 2 (1960): 249, which is incorporated by reference herein). It is also possible to utilize in addition to the silicic acid fillers, other fillers in limited quantities, (e.g., 2–10 wt % based on the total amount of fillers), e.g., fillers which are not light-colored, such as carbon blacks, and also light-colored, non-reinforcing fillers, such as chalk, lime, and zinc oxide, without impairing the advantages of the process of this invention.

The fillers generally have a specific surface area, measured according to ASTM D 3037, of up to 500 $m^2/g$, preferably 50–250 $m^2/g$, and a particle size smaller than 100 nm, preferably 10–50 nm.

In the preparation of the filler suspension, the procedure followed is suitably one wherein the filler is introduced together with the intended amount of the copolymer of acrylamide and dimethylaminoethyl methacrylate (hereinbelow called "copolymer" for short) into such a quantity of water that a suspension is obtained having a filler concentration of 20–500 g/l, preferably 200–250 g/l. It is, of course, also possible first to make a slurry of the filler and water and then to add the copolymer of this invention, or to stir the filler into an aqueous solution or suspension of the copolymer. The process is preferably carried out at a temperature of 50°–80° C.

The copolymer of acrylamide and dimethylaminoethyl methacrylate is utilized in an amount of 0.1–5% by weight, based on the amount of filler. A quantity of 0.5–2.0% by weight is preferred.

The copolymer can be produced according to known methods of the prior art by radical polymerization of the monomers acrylamide and dimethylaminoethyl methacrylate using azobisisobutyronitrile, for example by following the procedure disclosed in German Pat. No. 1,037,125 which is incorporated by reference herein. The proportion of the two monomers in the copolymers can be varied as desired. However, in the process of this invention, a copolymer is preferably employed with 5–95% by weight of acrylamide and, especially, one with 40–80% by weight of acrylamide.

The copolymer can be used in the process of this invention in the solid, water-soluble form, as well as in the form of an emulsion, for example as prepared by the process of DAS (German Published Application) No. 2,154,081 (U.S. Pat. Nos. 3,624,019 and 3,734,873, whose disclosures are incorporated by reference herein). However, preferably the copolymer is employed in the form of a water-oil emulsion, prepared according to the procedure of DOS (German Unexamined Laid-Open Application) No. 2,226,143 (U.S. Pat. No. 3,826,771, whose disclosure is incorporated by reference herein).

The homogeneous mixture of elastomer latex and filler suspension incorporating the amount of the copolymer of acrylamide and dimethylaminoethyl methacrylate required by this invention is suitably prepared in a commercial mixing device, such as a multicomponent nozzle, a mixing siren, high-speed agitator etc. The amount of filler suspension, based on the amount of filler, added to the latex mixture is generally 20–70 wt % based on the amount of elastomer.

Insofar as it is intended to produce elastomer-filler mixtures which contain extender oils, the oils known as elastomer plasticizers are preferably admixed at this point in an amount of up to 50 parts by weight, e.g., 3–50 wt parts, per 100 parts by weight of solid elastomer. Of course, it is also possible to previously add such plasticizers to the elastomer latex.

After homogenizing the mixture, the elastomer-filler mixture, which optionally contains extender oils, is precipitated by the addition of a Bronsted acid which does not attack the elastomer. Suitable acids include, for example, dilute sulfuric acid, hydrochloric acid, or phosphoric acid, wherein dilute sulfuric acid is preferred. During the precipitation, conventional effective amounts of electrolytes, such as, for example, sodium chloride, potassium aluminum sulfate, or other flocculants, e.g., polyglycols and polyamines, can also be added (see HoubenWeyl, "Methoden der organischen Chemie," vol. XIV/1 (1961), pp. 480 et seq., which is incorporated by reference herein).

The precipitation is suitably conducted at temperatures below the boiling point of water, for example within the range of 70° to 95° C., preferably 80°–90° C. The precipitation can be effected under excess pressure, but this feature is not critical to the process. The process of this invention can be carried out continuously as well as discontinuously.

After precipitation, the elastomer-filler mixture is obtained as a fine-grained suspension (particle diameter: 0.1–2 mm, measured by screen analysis according to ASTM D 1514). The following procedures are conventionally selectable. The precipitation mixture can first of all be separated from the main quantity of water by screening, filtering, decanting, or centrifuging. The remaining surface water (water which adheres to the surface of the elastomer-filler particles) is thereafter removed by squeezing or pressing in filter presses or screw-type presses. By thermal drying (hot circulating air or infrared radiation), conducted thereafter, the residual water is finally removed to the extent required by the desired further treatment of the elastomer-filler mixture.

The elastomer-filler mixtures producible according to the process of this invention are suitable for the production of rubber articles which are not black or wherein specific properties of the silicic acid-elastomer mixture provide advantages, for example in floor coverings, rubber soles, and whitewalls or treads for tires.

Without further elaboration, it is believed that one skilled in the art can, using the preceding description, utilize the present invention to its fullest extent. The following preferred specific embodiments are, therefore, to be construed as merely illustrative, and not limitative of the remainder of the disclosure in any way whatsoever. In the following examples, all temperatures are set forth uncorrected in degrees Celsius; unless otherwise indicated, all parts and percentages are by weight.

EXAMPLES 1–6 AND COMPARATIVE EXAMPLES A–E

(a) Elastomer Latices

The elastomer latex employed in Examples 1–4 and Comparative Examples A–D was a butadiene-styrene(77/23%) latex having approximately 25% by weight of solids content, produced by emulsion polymerization at 5° C. using an anionic emulsifier based on a resin acid-fatty acid.

The molecular size of the latex particles was 30 in Mooney units (ASTM D 1646) $ML_{1+4(100° C.)}$.

In Examples 5 and 6, as well as Comparative Example E, a corresponding latex was utilized having an $ML_{1+4(100° C.)}$ of 110.

(b) Filler Suspension

Respectively 300 g of the type of filler indicated in the table is made into a slurry with 2 l of water and heated under agitation to 80°–85° C. The filler suspension was then mixed under stirring with respectively 900 ml of a 0.5% by weight solution of a copolymer of acrylamide and dimethylaminoethyl methacrylate (70/30%), preheated to 80°–85° C., in conducting Examples 1–6.

(c) Elastomer-Filler Mixture

Respectively, 2 kg of the latices described under (a), heated to 80°–85° C., were stirred into 5 l of water at 80°–85° C. under intensive agitation, with a filler suspension per (b) above, for Examples 1–6 with the addition of the copolymer of this invention and for Comparative Examples A–E without this addition. Thereafter, the mixture was adjusted to pH 3–3.5 with 20% by weight sulfuric acid. After another 10 minutes of agitation, the precipitated elastomer-filler mixture was decanted, washed neutral with 2×10 l of water, and then filtered and dried.

The results are demonstrated by the following table. It can also be seen therefrom that for Examples 4–6 and Comparative Examples D and E, there was additionally added a commercial, high-aromatic extender oil and optionally also finely divided carbon black (SAF). These additives were introduced as follows: The oil was added to the latex in the indicated amount and emulsified therein. The carbon black was intermixed, as a 7% by weight aqueous suspension preheated to 80°–85° C. simultaneously with the filler suspension (b), with the elastomer latex, as indicated under (c).

TABLE

| Example or Comp. Example No. | Starting Materials Before Coagulation in (%) | | | | | Elastomer-Filler Mixture Obtained | | | |
|---|---|---|---|---|---|---|---|---|---|
| | Latex Solid | Light-Color Filler | Type of Light-Color Filler | Oil | Carbon Black (N-110) | Ash (%) Calc. | Ash (%) Found | Light-Color Filler (%) Incorporated | Light-Color Filler (%) Loss |
| A | 62.5 | 37.5 | Silicic Acid (1) | — | — | 37.5 | 4.5 | 12.0 | 88.0 |
| 1 | 62.5 | 37.5 | Silicic Acid (1) | — | — | 37.5 | 37.2 | 99.2 | 0.8 |
| B | 62.5 | 37.5 | Silicic Acid (2) | — | — | 37.5 | 6.7 | 17.9 | 82.1 |
| 2 | 62.5 | 37.5 | Silicic Acid (2) | — | — | 37.5 | 37.2 | 99.2 | 0.8 |
| C | 62.5 | 37.5 | Al Silicate (3) | — | — | 37.5 | 10.8 | 28.8 | 71.2 |
| 3 | 62.5 | 37.5 | Al Silicate (3) | — | — | 37.5 | 36.0 | 98.4 | 1.6 |
| D | 48.2 | 33.7 | Silicic Acid (1) | 18.1 | — | 33.7 | 7.3 | 21.7 | 78.3 |
| 4 | 48.2 | 33.7 | Silicic Acid (1) | 18.1 | — | 33.7 | 33.7 | 100.0 | — |
| 5 | 49.4 | 29.6 | Silicic Acid (1) | 18.5 | 2.5 | 29.6 | 28.8 | 97.3 | 2.7 |
| E | 49.4 | 29.6 | Silicic Acid (2) | 18.5 | 2.5 | 29.6 | 10.3 | 35.1 | 64.9 |
| 6 | 49.4 | 29.6 | Silicic Acid (2) | 18.5 | 2.5 | 29.6 | 29.0 | 98.0 | 2.0 |

(1) = Specific surface area 130 m²/g (BET Method)
(2) = Specific surface area 210 m²/g (BET Method)
(3) = Specific surface area 60 m²/g (BET Method)

The preceding examples can be repeated with similar success by substituting the generically or specifically described reactants and/or operating conditions of this invention for those used in the preceding examples. From the foregoing description, one skilled in the art can easily ascertain the essential characteristics of this invention, and without departing from the spirit and scope thereof, can make various changes and modifications of the invention to adapt it to various usages and conditions.

What is claimed is:

1. In a process for producing an elastomer-filler mixture, optionally containing an extender oil comprising the combined precipitation of a homogeneous mixture of
   (a) a synthetic elastomer latex, produced by emulsion polymerization in an anionic emulsifier system, and
   (b) an aqueous suspension of a silicic acid based filler, using an acid and, optionally, an electrolyte or other flocculant; separation of the precipitated mixture; and drying of the mixture;

the improvement wherein the filler suspension contains 0.1–5% by weight, based on the amount of filler, of a copolymer of acrylamide and dimethylaminoethyl methacrylate.

2. A process of claim 1, wherein the copolymer comprises 5–95% by weight of acrylamide.

3. A process of claim 2, wherein the copolymer comprises 40–80% by weight of acrylamide.

4. A process of claim 1, wherein the copolymer is added to the filler suspension in the form of a water-in-oil emulsion.

5. A process of claim 1 wherein the elastomer latex is a styrene butadiene latex.

6. A process of claim 1 wherein the filler is silicic acid.

7. A process of claim 1 wherein the filler suspension comprises another filler in addition to the silicic acid based filler.

8. A process of claim 3, wherein the amount of copolymer is 0.5–2.0 wt %.

9. A process of claim 1, wherein the elastomer filler mixture comprises an extender oil.

10. In a process for precipitating an elastomer-filler mixture, optionally containing an extender oil, comprising adding an acid and, optionally, an electrolyte or other flocculant to a homogeneous mixture of (a) a synthetic elastomer latex, produced by emulsion polymerization in an anionic emulsifier system, and (b) an aqueous suspension of a silicic acid based filler, the improvement wherein the filler suspension contains 0.1–5% by weight, based on the amount of filler, of a copolymer of acrylamide and dimethylaminoethyl methacrylate.

11. An elastomer-filler mixture comprising a copolymer of acrylamide and dimethylaminoethyl methacrylate produced by the process of claim 1.

* * * * *